(12) United States Patent
Hancock et al.

(10) Patent No.: US 8,534,519 B2
(45) Date of Patent: Sep. 17, 2013

(54) ATV HOLDER UNIT WITH STACKED ARTICLE RECEIVERS

(75) Inventors: Jeffrey D. Hancock, Uintah, UT (US); Chris Schenck, Uintah, UT (US)

(73) Assignee: Jeffrey D. Hancock, Uintah, UT (US)

( * ) Notice: Subject to any disclaimer, the term of this patent is extended or adjusted under 35 U.S.C. 154(b) by 150 days.

(21) Appl. No.: 12/925,158

(22) Filed: Oct. 15, 2010

(65) Prior Publication Data

US 2012/0091178 A1    Apr. 19, 2012

(51) Int. Cl.
*B60R 11/00* (2006.01)

(52) U.S. Cl.
USPC ............ 224/401; 224/552; 224/558; 224/571

(58) Field of Classification Search
USPC .............. 224/401, 42.38, 571, 420, 459, 461, 224/537, 567, 570, 552, 558; 211/64; 248/74.2, 316.7
See application file for complete search history.

(56) References Cited

U.S. PATENT DOCUMENTS

| | | | | |
|---|---|---|---|---|
| 2,578,067 | A * | 12/1951 | Jensen | 224/558 |
| 3,304,038 | A * | 2/1967 | Guthrie | 248/71 |
| D417,612 | S * | 12/1999 | Jones | D8/395 |
| 6,484,913 | B1 * | 11/2002 | Hancock et al. | 224/401 |
| D482,489 | S * | 11/2003 | Gary et al. | D26/138 |
| 6,929,223 | B2 * | 8/2005 | Hancock et al. | 248/74.2 |
| D516,402 | S * | 3/2006 | Gates et al. | D8/71 |
| 7,337,934 | B2 * | 3/2008 | Alling et al. | 224/401 |
| 7,681,768 | B2 * | 3/2010 | Gates et al. | 224/440 |
| D626,494 | S * | 11/2010 | Gates et al. | D12/412 |
| 2003/0042282 | A1 * | 3/2003 | Gates et al. | 224/560 |
| 2004/0020954 | A1 * | 2/2004 | Gates et al. | 224/442 |

* cited by examiner

*Primary Examiner* — Nathan J Newhouse
*Assistant Examiner* — Corey Skurdal (57) ABSTRACT

A holding unit for articles to be carried on an all terrain vehicle, or the like, comprising a mounting base adapted to be secured to various surfaces and components of the vehicle and extending downwardly from a support arm adjustably positioned and securely fixed and at least one article holder having stacked cradles to receive articles to be held in a stacked arrangement.

5 Claims, 12 Drawing Sheets

ATV HOLDER UNIT WITH STACKED ARTICLE RECEIVERS

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO MICROFICHE APPENDIX

Not Applicable.

BACKGROUND OF THE INVENTION

Field of the Invention

This invention relates to holders for articles and is primarily intended for use on all-terrain (ATV) vehicles including, but not limited to, off-highway wheeled vehicles, bicycles and motorcycles and off-highway tracked vehicles, such as snowmobiles.

BRIEF SUMMARY OF THE INVENTION

Objects of the Invention

Principal objects of the present invention are to provide a holder for articles having a base assembly that is readily mounted on and secured to a flat body; a carrying rack surface; or to tubular members, such as are commonly found as handle bars and/or carrying racks on all-terrain vehicles. It is also an object to provide an article holder that is readily secured to the base assembly and a base assembly that is easily mounted to tubular members of different sizes and shapes.

Other objects are to provide an article holder that can be structurally arranged to support a number of articles in a stacked arrangement and multiple stacked articles in side-by-side arrangements.

Still other objects are to provide an article holder usable in aligned pairs to hold articles in both stacked and side-by-side relationships.

Other objects are to provide an article holder that when used in pairs will securely hold elongate articles having varying sizes and shapes. Further objects are to provide an article holder that will cushion a secured article and will allow for quick, easy retrieval of the article from the article holder.

FEATURES OF THE INVENTION

A support arm is adjustably connected to a mounting base and can be readily positioned to allow for positioning of one or more article holders in a "best" position to hold articles on an all terrain vehicle (ATV). Each article holder is positioned on the support arm and includes stacked cradles that will receive and hold different sizes and types of articles in a stacked relationship.

Each article holder has a bottom cradle to securely hold articles having a small cross-sectional area and an upper cradle that will receive larger articles and will securely hold articles having larger cross-sectional configurations and with both the bottom cradle and the upper cradle securely gripping articles placed therein and securely holding them until such articles are retrieved by a user.

More than one multiple cradle article holder can be mounted on the support arm to allow articles to be held in a side-by-side relationship. It will become apparent that more than two stacked cradles can be formed as part of a single article holder.

Each article holder has an interior skeleton construction that is formed to have arms that will extend upwardly and outwardly from a bottom connecting yoke The skeleton is made from a strong durable, but somewhat flexible plastic material that includes thicker, less resilient lower arm portions and thinner more flexible upper arm portions, terminating in outwardly extending enlarged upper ends.

A resilient, softer plastic type outer coating is formed over the arms and yoke of the skeleton. The outer coating serves to better grip articles placed in the article holder and to cushion the articles during travel of the vehicle to which the article holder is secured.

The outer coating, inside the arms, also is formed to provide walls for the stacked cradles of the article holder. The walls include closed, large air cells with opposed article engaging inner surfaces at each side of each stacked cradle. A detent at the top of each inner surface flexes to allow insertion of an article into the cradle and then holds the article from being removed from the cradle until a sufficient lifting force is applied by a user to again allow the detent to flex and the article to be removed.

Parallel, spaced apart rows of ribs may be formed on the upper, inner surfaces of the cradle to better engage and frictionally hold inserted articles Additional spaced rows of ribs or flexible fingers may also be provided on the walls of the air cells remote from the inner surfaces of the cradles at each side of each stacked cradle to provide a further biasing force that better holds the inner surface of the cradle against a large article that is placed in the cradle and that expands the cradle to near full size.

Smaller interior lower air cells may be provided within the larger air cells to provide additional cushioning effect for articles placed in the stacked cradles.

Additional objects and features of the invention will become apparent from the following drawings and detailed description.

BRIEF DESCRIPTION OF THE FIGURES OF THE INVENTION

In the Drawings

DETAILED DESCRIPTION

Referring Now to the Drawings

In the preferred embodiment of the invention, a holding unit for articles to be carried on an ATV, or the like, is shown generally at 20. The holding unit includes a mounting base, shown generally at 22; a support arm, shown generally at 24; a clamping assembly, shown generally at 26; and an article holder, shown generally at 28.

Figure 4:
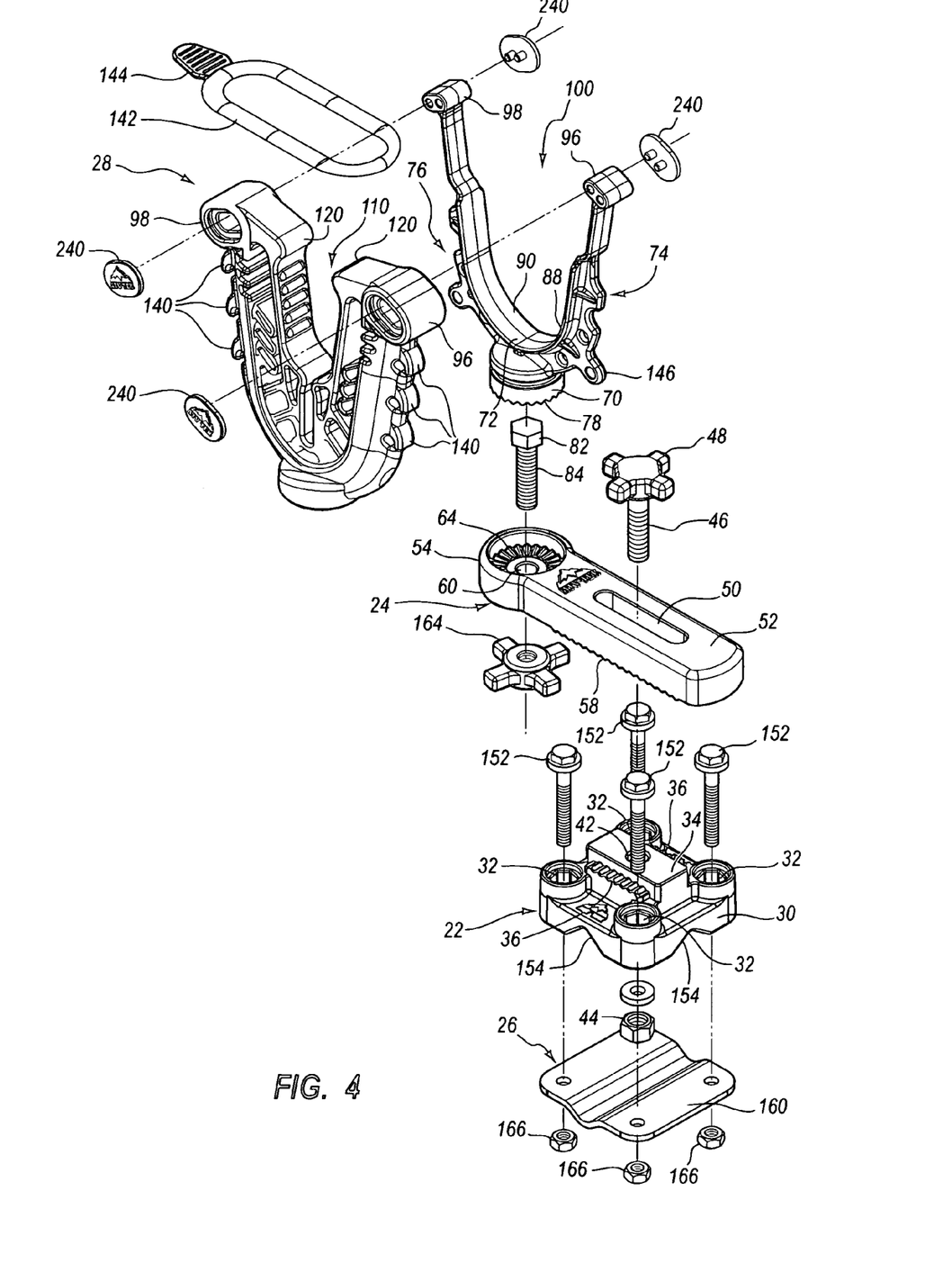
FIG. 4, an exploded perspective view of the embodiment of holder unit shown in FIGS. 1-3; 5-9, and 11.
Figure 5:
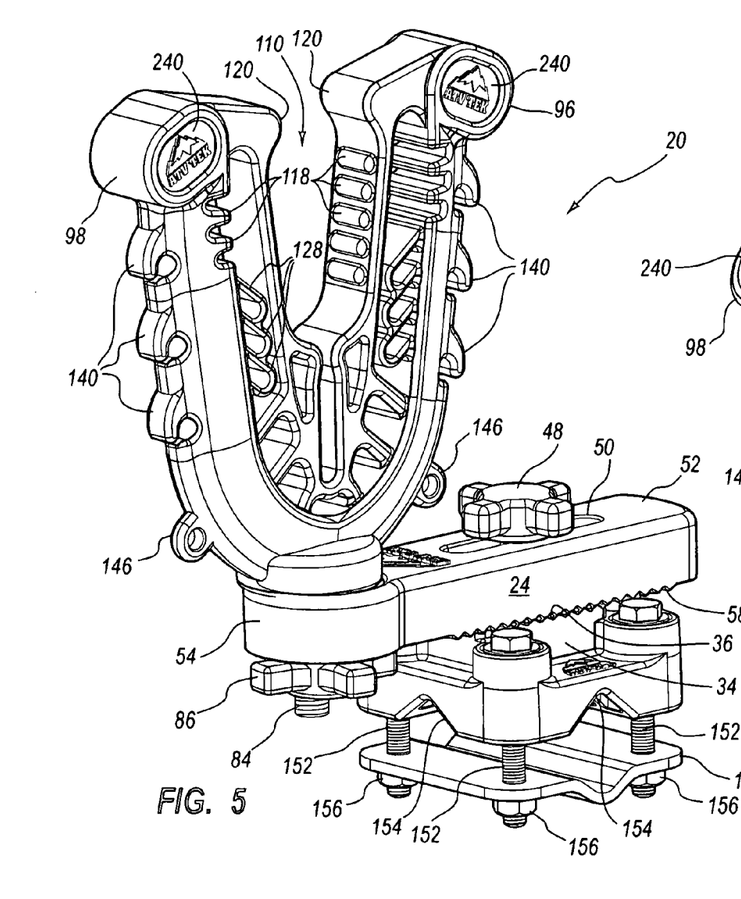
FIG. 5, a front perspective view of a single holder unit of the invention.
Figure 6:
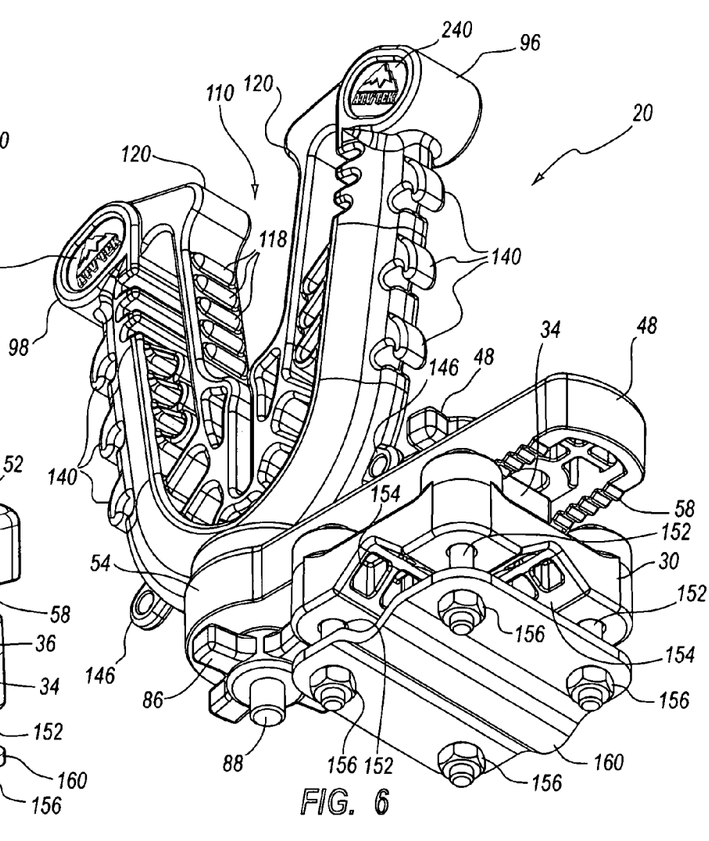
FIG. 6, a similar view taken from beneath.
Figure 7:
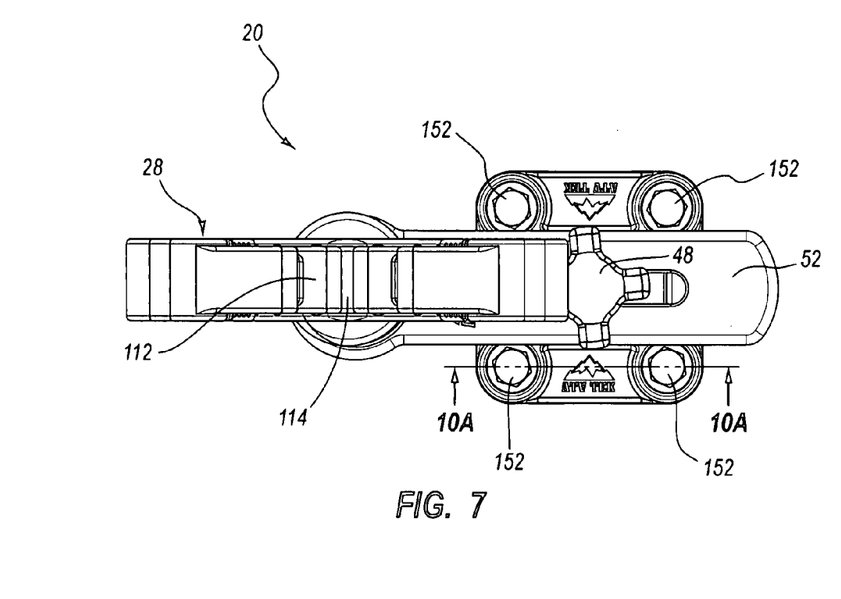
FIG. 7, a top plan view.
Figure 8:
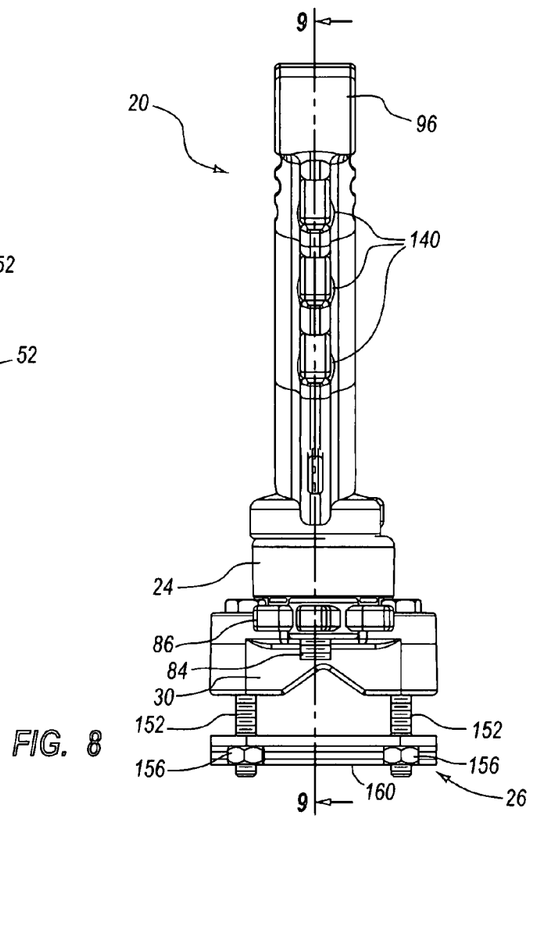
FIG. 8, a side elevation view.

Mounting base 22 comprises a platform 30 with a hole 32 through the platform at each of four corners thereof. A raised rack 34 is formed across the top of platform 30 between pairs of holes 32. Parallel rows of teeth 36 extend across the rack 34.

A slot 40 is formed lengthwise through the rack and teeth 36. A bore hole 42 is formed through the raised rack 34 and slot 40 slot and a nut 44 is embedded in the rack to receive a shank 46 of a bolt 48 that is inserted through the bore hole to be threaded into a nut 44.

Before being passed through bore hole 42 the bolt shank 46 is passed through a slot 50 formed longitudinally through the elongate support arm 24. The support arm 24 has a top surface 52 with an article holder receiver 54 formed in one end of the arm 24 A bottom surface 56 of the arm 24 has parallel rows of teeth 58 that will mesh with the teeth 36 of rack 34. The article holder receiver 54 is generally bowl shaped and has a central hole 60 extending through the bottom 62 thereof. A ring of teeth 64 surround the hole 60 at the bottom of the bowl, inside the receiver 54.

An insert member 70 projects downwardly from the center of a yoke 72 that connects the bottom of a pair of article holder arms 74 and 76. The insert member 70 is shaped to conform to the interior shape of the receiver 54 and has a ring of teeth 78 that mesh with teeth 64 when the insert member 70 is positioned in the receiver 54. Insert member 70 may be removed from receiver 54 and turned to change the relationship of the insert member to the arm 24. A bolt 80 has a head 82 embedded in the insert member and a shank 84 of the bolt is inserted through hole 60. A nut 86 is threaded onto the shank 84 to secure the article holder 28 to the support arm 24.

Yoke 72 is integral with and connects the bottom end 88 and 90 of outwardly flared and upwardly extending skeleton arms 92 and 94, respectively. The yoke 72 and arms 92 and 94 all form a skeleton 100 made of a hard, but somewhat resilient, plastic, or the like. The skeleton arms 92 and 94 are made thicker and less resilient at lower ends 102 and 104 where they connect to yoke 72. The arms 92 and 94 are less thick intermediate their lengths and therefore are more resilient in the intermediate lengths than in their lower ends. Arms 92 and 94 are thinner and therefore most resilient at their upper ends. At their top ends, arms 92 and 94 respectively, are formed to have loops 96 and 98 that are cantilevered in opposite directions from the arms.

Figure 9:
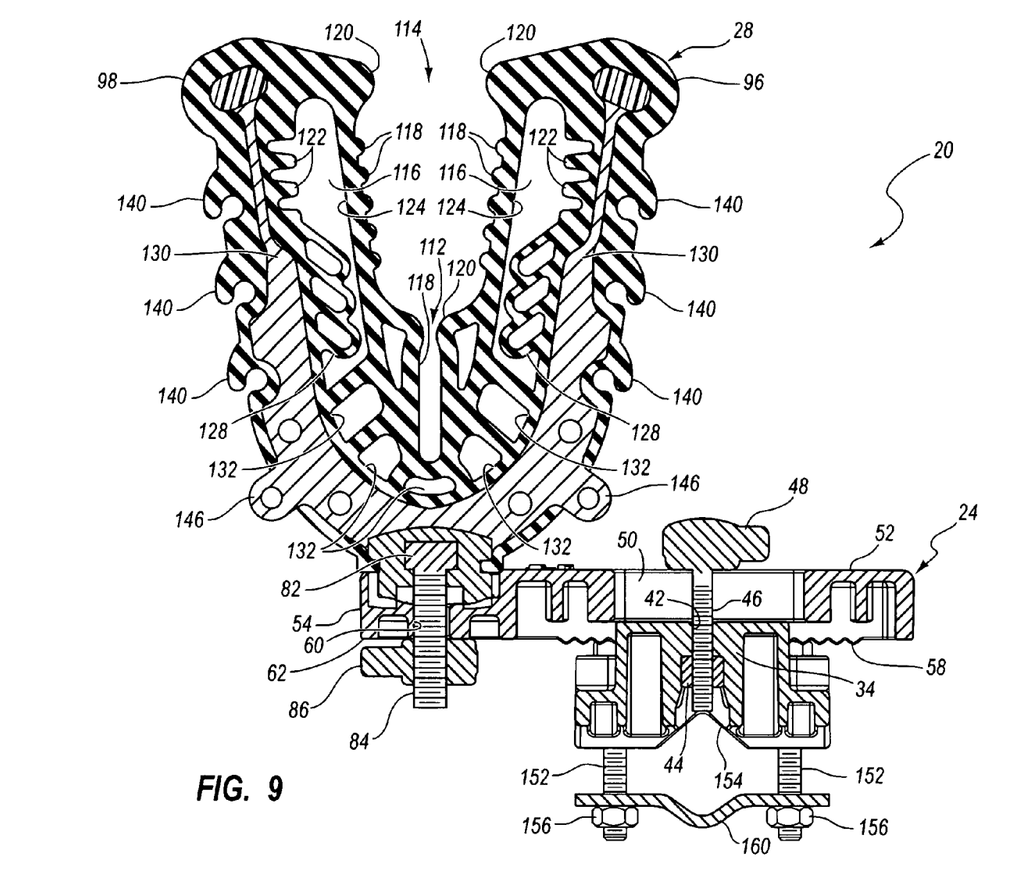
FIG. 9, a vertical section, taken on the line 9-9 of FIG. 8.

A resilient, softer plastic, or the like, outer coating, shown generally at 110 is formed over the arms 92 and 94 and yoke 72. The outer coating provides for better gripping and cushioning of articles placed in stacked cradles 112 and 114 of the article holder 28. The outer coating 110 inside the walls is also formed to provide walls for the stacked cradles 112 and 114 of the article holder 28. The walls include closed large air cells 116 with opposed article engaging inner surfaces 118 at opposite sides of each stacked cradle 112 and 114. Opposed detents 120 at the top of each inner surface 118 flex to allow insertion of articles into the cradles 112 and 114. The detents close against and over inserted articles and secure the articles until they are forcefully removed by a user.

Parallel spaced rows of ribs 122 on the upper, inner surfaces 124 of the cradles additionally engage and frictionally secure inserted articles in the stacked cradles 112 and 114. Other spaced rows ribs 126 and/or flexible fingers 128 project from the walls 130 of the large air cells 116 that are remote from the inner surfaces 124 of the cradles. The ribs 126 and/or flexible fingers 128 provide a further biasing force to hold the inner surface 124 of a cradle against large articles inserted into the cradle that expand the cradle until the other spaced ribs and fingers are contacted by the inner surface of the cradle.

Smaller interior cells 132 in lower portions of the large air cells 116 provide additional cushioning for articles fully inserted to the depths of the cradles and provide a lifting force to facilitate article removal by a user.

Outer coating 110 also has formed, down-turned hooks 140 spaced along the exterior surfaces of the article holder arms. The hooks allow one or more resilient band 142, having pull tab 144 thereon (FIG. 16) to be placed with one end under a hook 140 on one article holder arm 74 or 76 and to be stretched over the article holder arms and any article positioned in such arms and then beneath a hook on the other article holder arm 74 or 76. Separate resilient bands 142 can be used for separate articles secured in the stacked cradles of an article holder 28.

Figure 1:
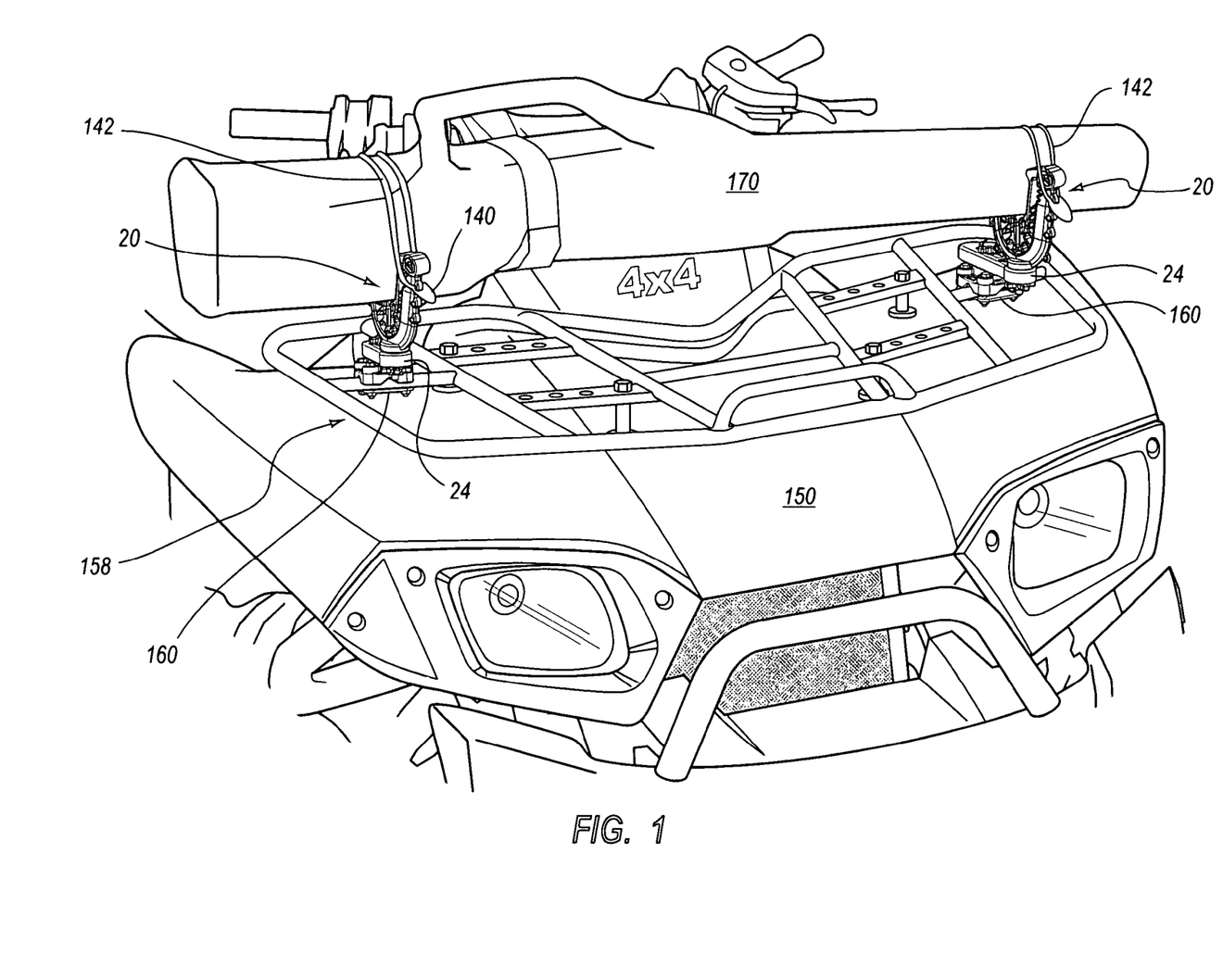
FIG. 1 is a perspective view of a pair of holder units of the invention mounted on a rack located on a hood of an all terrain vehicle (ATV), shown fragmentarily, and with the article holders of the units securing a long gun in a soft case.
Figure 2:
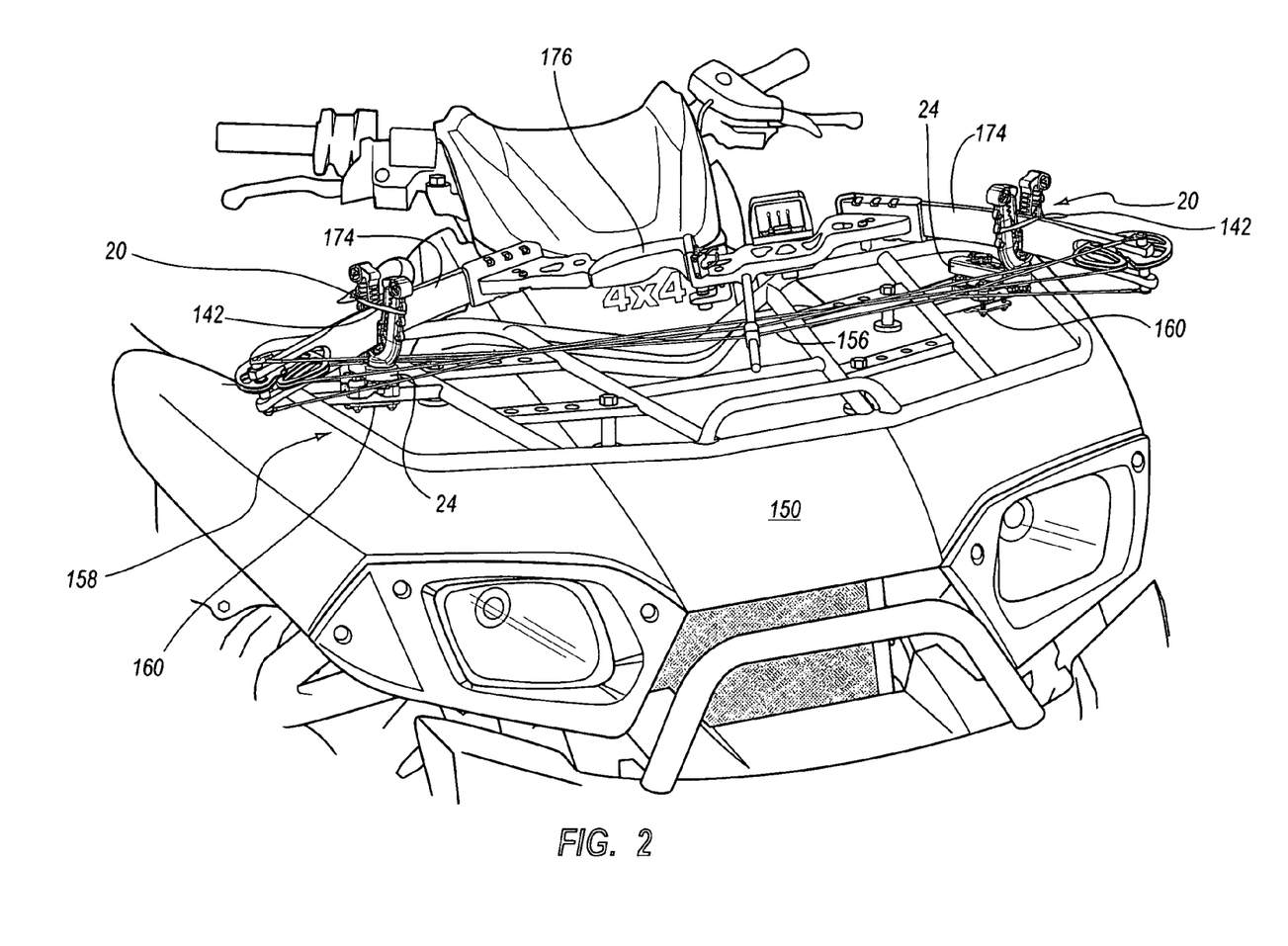
FIG. 2, a similar view, but showing an archery bow, and with limbs, of the bow secured in article holders.
Figure 3:
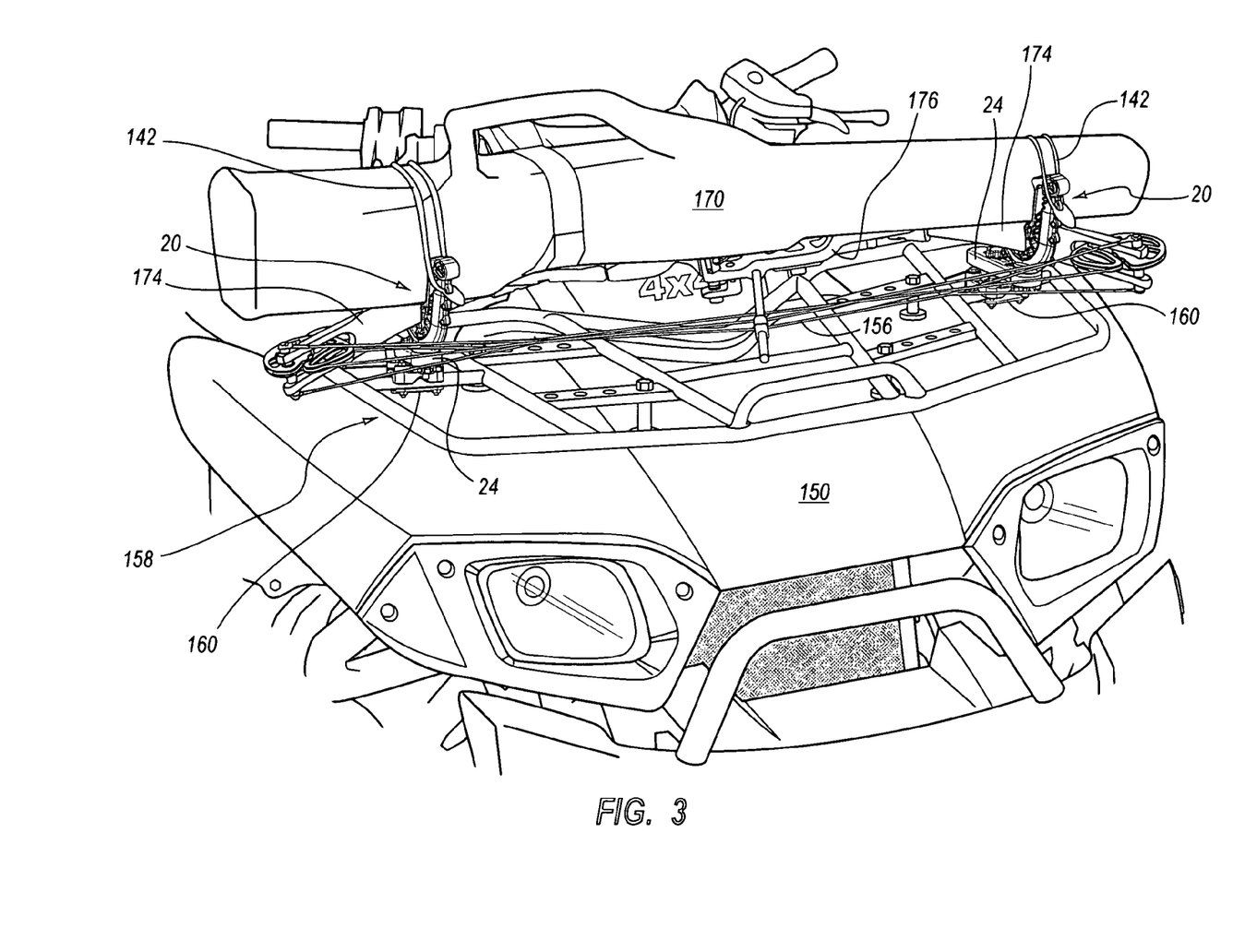
FIG. 3, a view like that of FIG. 1 and FIG. 2, but showing a bow secured in lower receiving cradles and a long gun in a soft case secured in upper receiving cradles of the article holders.

Eyelets 146 are formed integral with and project from the yoke 72, with one eyelet provided at the base of each article holder arm 74 and 76. Conventional resilient cords having hooks on the opposite ends thereof (not shown), can, like the resilient bands 142, be used to securely hold articles in the stacked cradles 112 and 114. While such cords can be used in a variety of ways it is most common to place one end hook through one eyelet 146 at the bottom of one article holder arm 74 or 76, stretch the cord over an article resting in a stacked cradle 112 or 114 and to insert the hook at the other end of the cord through the other eyelet 146 at the bottom of the other article holding arm 74 or 76, A pair of holding units 20 are generally used to secure elongate articles to an ATV 150, or the like. Each holding unit may be secured to the vehicle 150 by inserting bolts 152 downwardly through the holes 32 of mounting base 22 and through holes (not shown) in a platform surface of the vehicle (not shown) to have securement nuts (not shown) threaded thereon to hold the mounting base in position. More often, as shown in FIGS. 1, 2 and 3, a V-notch 154 in the bottom of the mounting base 22 is positioned on a tubular member 156 of a carrier rack 158 mounted on the vehicle 150. The bolts 152 are then positioned to straddle a tubular member 154 of a rack 156 mounted on the vehicle. Two bolts 152 are positioned at each side of the tubular member. A clamping plate 158 has a V-notch 160 on one surface and the V-notch 160 is positioned beneath and against the tubular member 154. Bolts 152 are inserted through holes 162 in the clamping plate and nuts 164 are threaded onto the ends of the bolts to secure the holding unit 20 to the rack 156.

As shown in FIG. 1, a long gun (not shown) inside a soft gun case 170 to be carried on the ATV 150 is inserted downwardly into the uppermost stacked cradles 114 of the spaced apart holder units 20 that are secured to the rack 156. The soft gun case 170 is too large to be pushed down into the lower cradle 112 but is securely held in the upper stacked cradle 114 in the manner previously described.

As shown in FIG. 2, the limbs 174 of an archery compound bow 176 are turned to allow them to be pushed downwardly through the upper cradles of the spaced apart holding units 20 and into the lower cradles 112 to be securely held in the manner previously described.

As shown in FIG. 3, the limbs 174 of the bow 176 are positioned and held in the lower cradles 112 of the holder units 20 and the soft gun case 170 and its contents are positioned and held in the upper cradles 114 of the holding units 20.

Figure 10A:
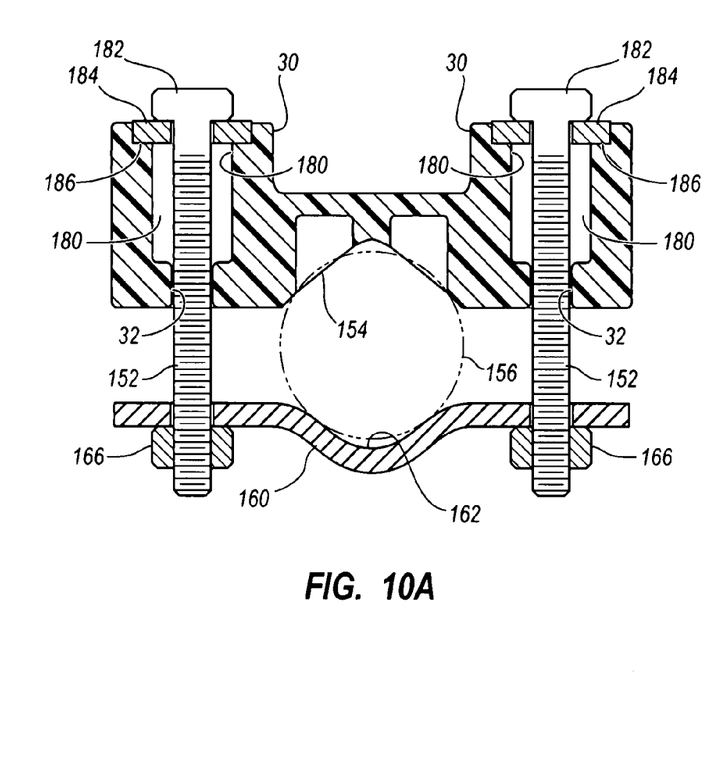
FIG. 10A, a vertical section taken on the line 10A-10A of FIG. 7 and showing the mounting base arranged to fit on a smaller diameter cylindrical member.
Figure 10B:
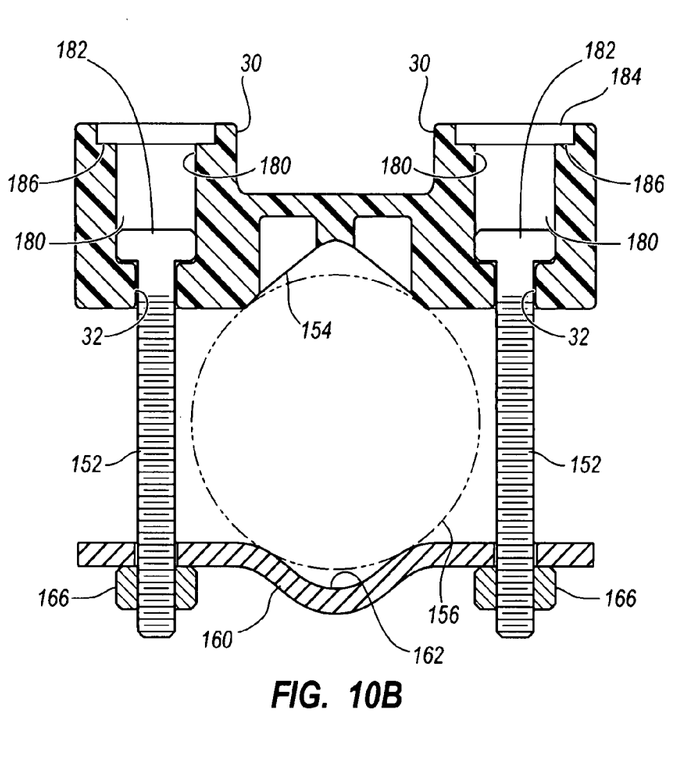
FIG. 10B, a view like that of FIG. 10A but showing the mounting base arranged to fit on a larger diameter cylindrical member.

Each hole 32 through corners of the platform 30 of the mounting base 22 includes a counter bore 180 having a diameter just large enough to allow a head 182 of a bolt 152 to pass through and an upwardly projecting wall 184 encircling the counter bore. A shelf 186 is provided at the top of each counter bore. A flat washer 188, having a diameter just large enough to allow the shank of the bolt 152 to pass through, rests on each shelf 184 and prevents the bolt head 192 from entering the counter bore 180. When the holder units are attached to a relatively larger tubing member the flat washers 188 are not used and the inserted bolt heads 182 rest at the tops of bores 32 and the bolt shanks will extend through the holes in the clamping bracket to have nuts threaded thereon. If, however the holder unit 20 is to be secured to a tubing member of relatively smaller diameter, the flat washers are positioned on the shelves 184 and the same length bolt shanks are inserted through the holes in the flat washers and the bore holes 32 to have nuts threaded thereon. The same mounting base 22 is adaptable for use with racks on ATVs and the like, having different sizes of tubing, merely by using, or not using, the flat washers 188. The same bolts can be used for sacrament of the mounting base 22 to tubing members of different sizes and excess bolt lengths that project to be unsightly and dangerous are avoided.

Figure 11:
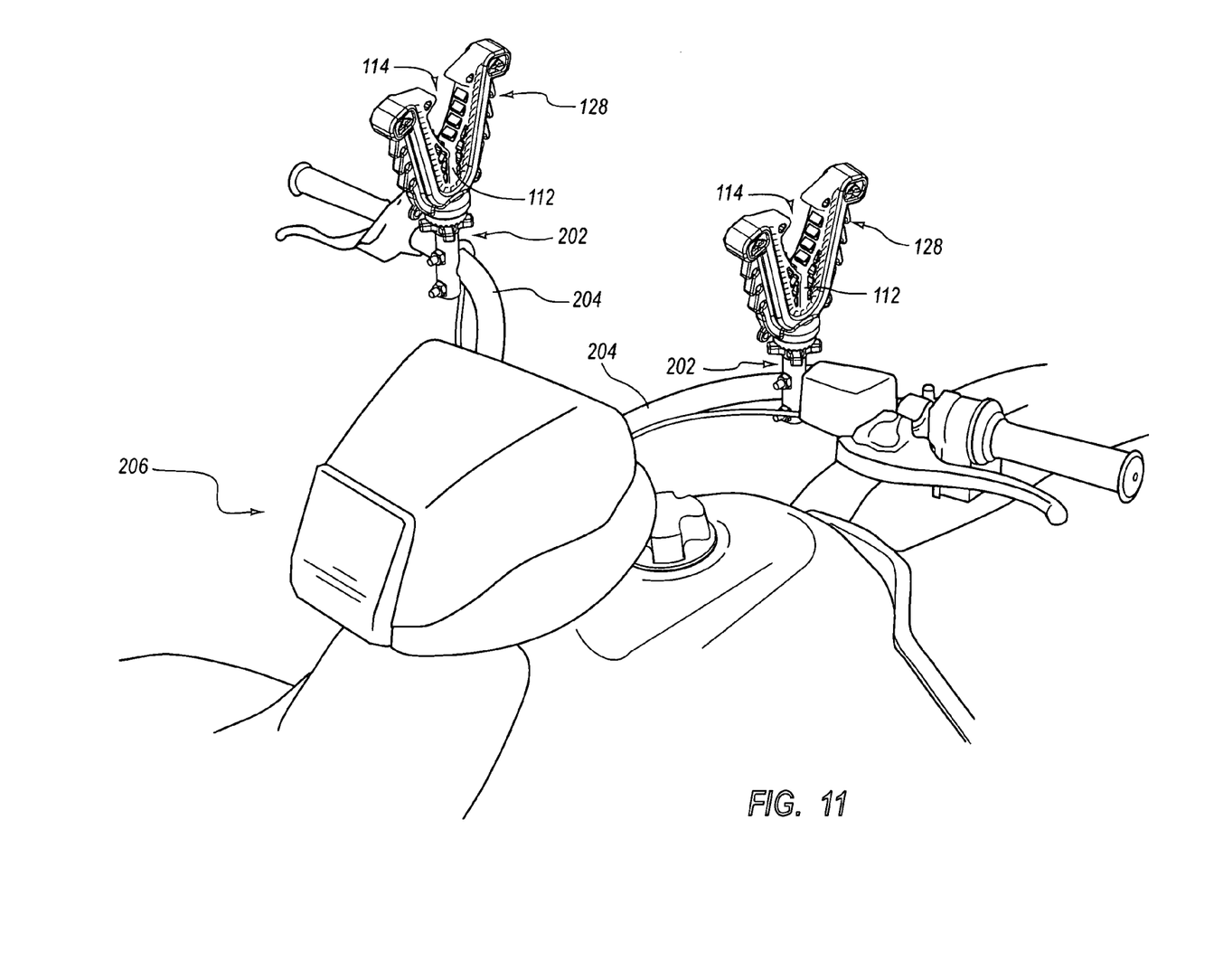
FIG. 11, a perspective view showing a pair of holder units of the invention mounted on a motorcycle handlebar.

In the embodiment of the holding unit, shown generally at 200 in FIGS. 11-15, the article holder 28 is the same as previously described. In this embodiment, the mounting base 202 is intended to be clamped to a tubular member, such as a handlebar 204 of an ATV, or the like, shown fragmentarily at 206 (FIG. 11). Mounting base 202 includes a support arm 208; a clamping assembly, shown generally at 210; and the article holder 28 which has stacked article receiving and holding cradles 112 and 114, as previously described.

Figure 12:
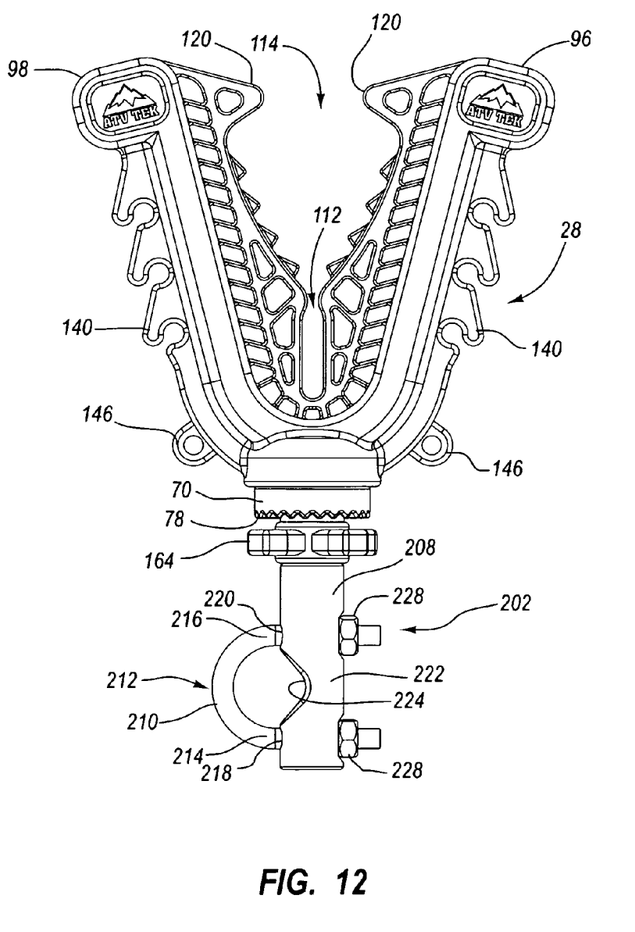
FIG. 12, a front elevation view of another embodiment of holder unit.
Figure 13:
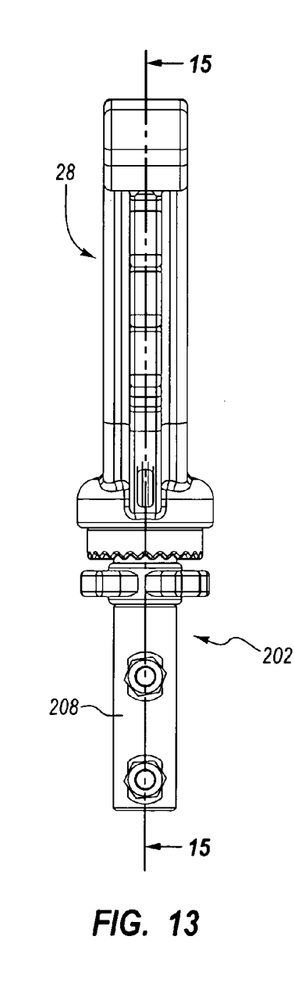
FIG. 13, a side elevation view of the embodiment shown in FIG. 12.
Figure 14:
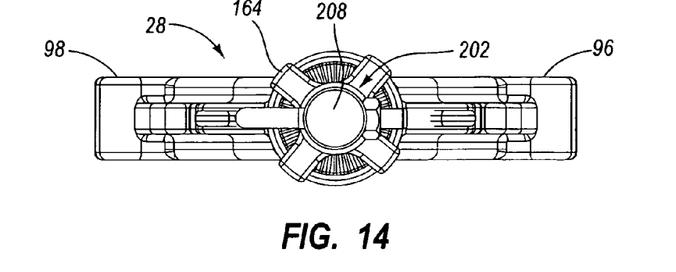
FIG. 14, a top plan view of the embodiment shown in FIG. 12.
Figure 15:
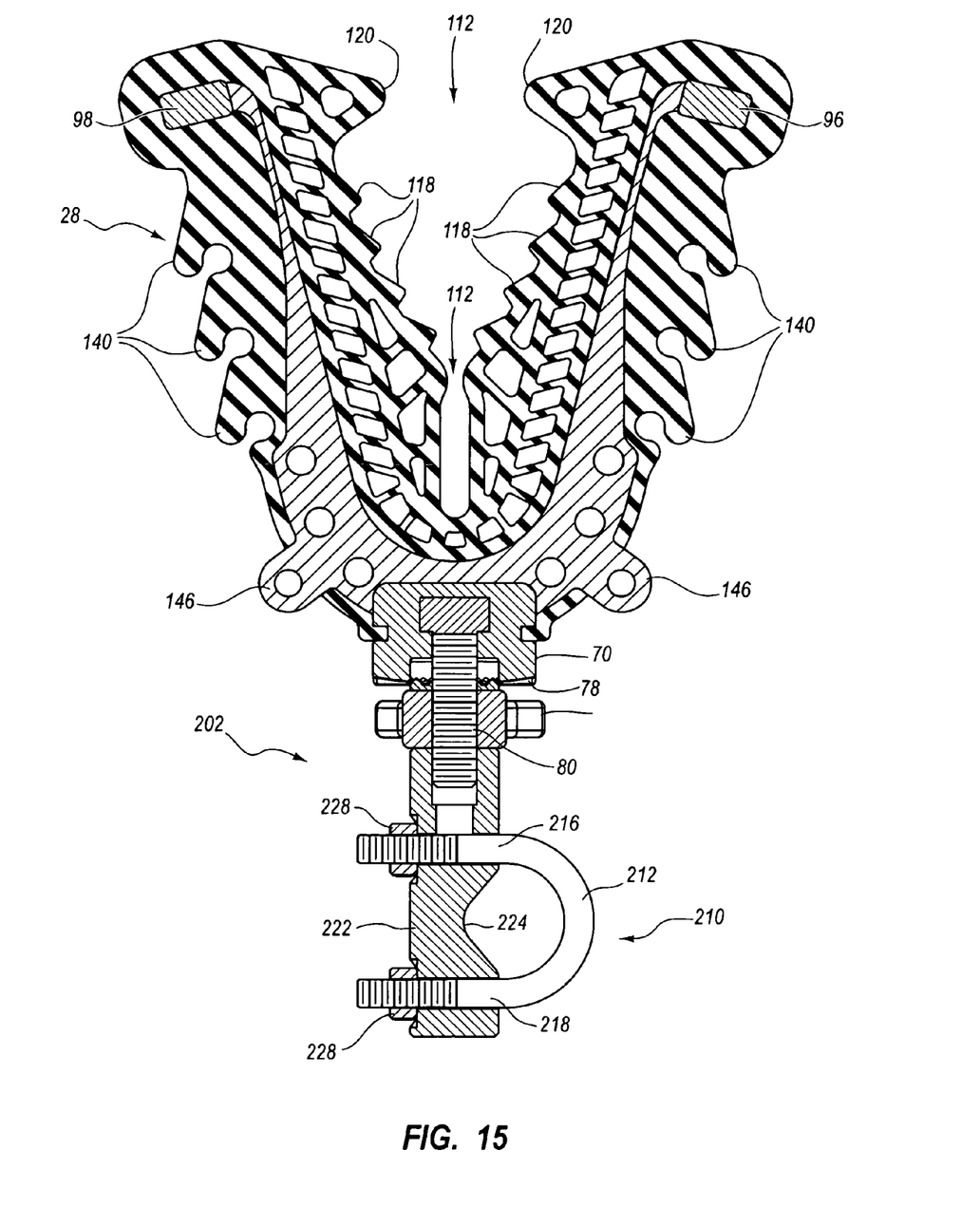
FIG. 15, an enlarged vertical section taken on the line 15-15 of FIG. 13.

Clamping assembly 210 comprises a U-bolt 212 with legs 214 and 216 that are inserted through spaced apart holes 218 and 220 at a lower end 222 of the support arm 208. The legs straddle a V-notch 224 in the bottom end of the support arm 208 and a handlebar extending between the support arm 208 and the web 226 of the U-bolt 212. A nut 228 is threaded onto the end of each leg 214 and 216. The upper end 230 of support arm 208 has a threaded bore 232 formed therein. The threaded end of bolt 80 extends from insert member 70 through a washer 234 having a ring of teeth 236 formed around the periphery of an upper face thereof. A hand turned nut 238 is threaded onto the threaded upper end of support arm 108. Nut 238 is turned to press the teeth 236 of washer 234 tightly into engagement with the ring of teeth 78 and to prevent undesired rotation of the article holder 28. Release of the nut 238 of each of a pair of spaced apart holding units to remove pressure on the washers 234 will allow the article holders of the holding units to be rotated so that articles can be positioned and retained in the stacked cradles of the article holders. The nuts 238 are turned to move the washers 234 against the teeth 236 and to lock the article holders 28 in place.

Figure 16:
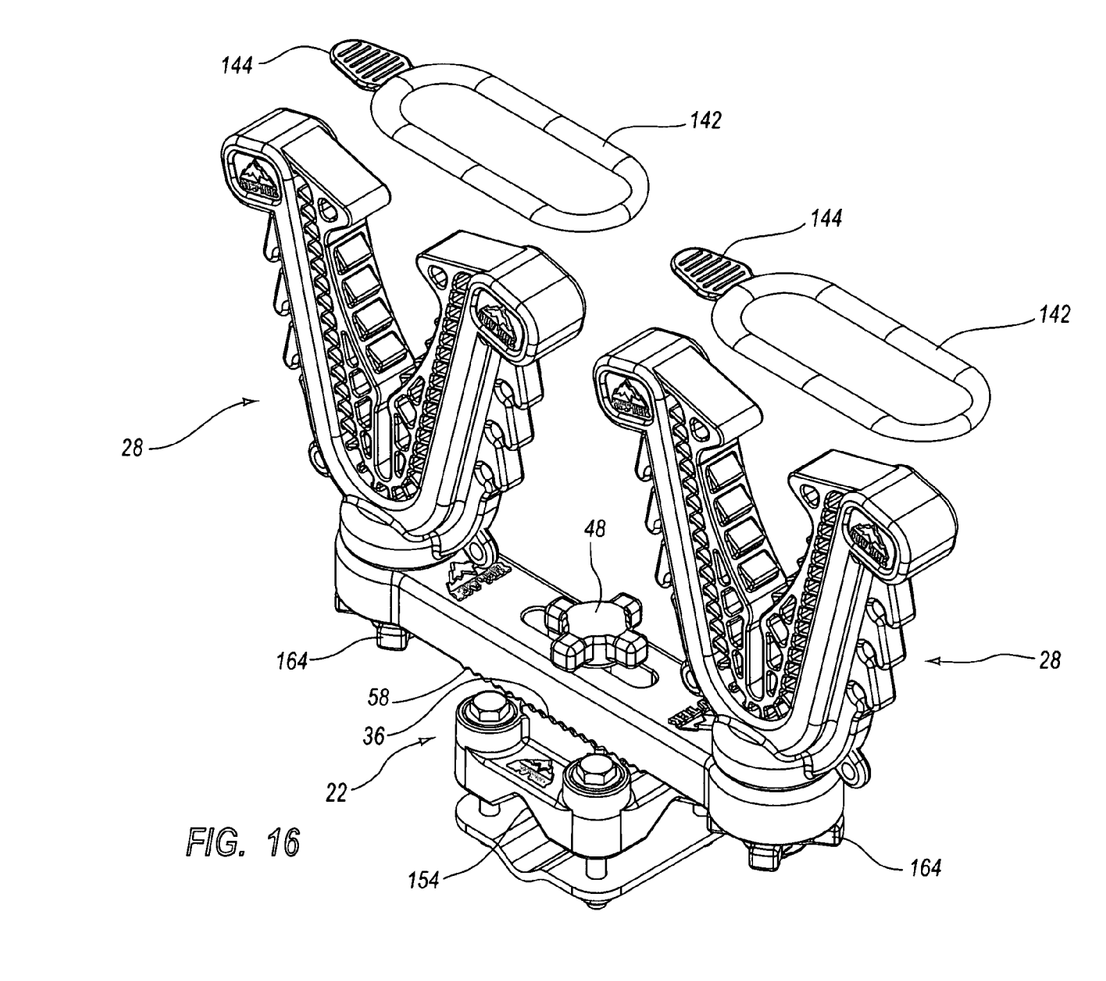
FIG. 16, an exploded perspective view showing a pair of holder units with article holders mounted side-by-side on a mounting base and with a typical resilient band to be used with each article holder.

A holder unit 20 may also have a pair of article holders 28 mounted on a support bar 24, as shown in FIG. 16. In this embodiment the mounting base 22 extends downwardly from beneath the center area of the support bar 24. One article holder 28 is mounted to one end of support bar 24 in the manner heretofore described and the other article holder 28 is similarly mounted to the opposite end of the support bar. Two spaced apart holder units 20, each having a pair of article holders mounted thereon can secure four articles in a top and bottom and front and back arrangement.

If desired, decorative tabs 240 may be inserted into open ends of the loops 96 and 98 not covered by the soft plastic coating 110.

Although preferred embodiments of our invention have been herein described, it is to be understood that the present disclosure is by way of example and that variations are possible without departing from the subject matter coming within the scope of the following claims, which subject matter we regard as our invention.

We claim:

1. A holding unit with stacked article receivers comprising:
a mounting base including a platform;
means for positioning and securing said platform on a surface;
a support arm secured to and projecting from said platform;
an article holder mounted on said support arm, said article holder extending upwardly from said platform;
cooperating means on said support arm and said article holder to secure said article holder in a selected position with respect to a longitudinal axis of said support arm;
a yoke;
means beneath said yoke for securing said yoke to said support arm;
a pair of holder arms extending upwardly from opposite sides of said yoke, said holder arms being closer together at lower portions thereof to form a first smaller receiver cradle between said lower portions of said holder arms and said holder arms being flared upwardly and outwardly from a top of said first smaller receiver cradle to form a second larger receiving cradle, said upper ends of the holder arms having detents formed of the resilient covering thereon, said detents being yieldable to allow inserted articles to pass into the receiver cradles and to rebound to extend over said inserted articles;
a central skeleton forming a core of said yoke and said holder arms, said skeleton being formed from a substantially rigid material having limited resiliency;
a soft, resilient covering surrounding said skeleton, said covering forming an outer wall and an inner wall on each holder arm, said inner walls having larger air cells formed between holder arm contacting surfaces and outer article engaging surfaces, to collapse as articles are inserted into said receiver cradles and to expand as articles are removed from said receiver cradles;

fingers in said larger air cells extending downwardly from the outer arm engaging surface and downwardly toward said article engaging surface; and smaller air cells within said fingers in said larger air cells.

2. A holding unit with stacked article receivers comprising:

a mounting base including a platform;

means for positioning and securing said platform on a surface;

a support arm secured to and projecting from said platform;

an article holder mounted on said support arm, said article holder extending upwardly from said platform;

cooperating means on said support arm and said article holder to secure said article holder in a selected position with respect to a longitudinal axis of said support arm;

a yoke;

means beneath said yoke for securing said yoke to said support arm;

a pair of holder arms extending upwardly from opposite sides of said yoke, said holder arms being closer together at lower portions thereof to form a first smaller receiver cradle between said lower portions of said holder arms and said holder arms being flared upwardly and outwardly from a top of said first smaller receiver cradle to form a second larger receiving cradle, the upper ends of said holder arms having detents formed of the resilient covering thereon, said detents being yieldable to allow inserted articles topass into the receiver cradles and to rebound;

a central skeleton forming a core of said yoke and said holder arms, said skeleton being formed from a substantially rigid material having limited resiliency;

a soft, resilient covering surrounding said skeleton, said covering forming an outer wall and an inner wall on each holder arm, said inner walls having larger air cells formed between holder arm contacting surfaces and outer article engaging surfaces, to collapse as articles are inserted into said receiver cradles and to expand as articles are removed from said receiver cradles, and fingers in said larger air cells extending downwardly from the outer arm engaging surfaces and toward said article engaging surfaces; and smaller air cells within said fingers in said larger air cells.

3. A holding unit as in claim 2, further including:

an eyelet formed integral with and projecting from the yoke at the base of said article holder arms.

4. A holding unit as in claim 3 further including:

spaced apart downturned hooks spaced along the exterior surface of each article holding arm.

5. A holding unit as in claim 4, further including:

an eyelet formed integral with and projecting from the yoke at the base of said article holder arm.

\* \* \* \* \*